(12) United States Patent
Porikli et al.

(10) Patent No.: US 7,720,289 B2
(45) Date of Patent: May 18, 2010

(54) METHOD FOR CONSTRUCTING COVARIANCE MATRICES FROM DATA FEATURES

(75) Inventors: Fatih M. Porikli, Watertown, MA (US); Oncel Tuzel, Piscataway, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1159 days.

(21) Appl. No.: 11/305,427

(22) Filed: Dec. 14, 2005

(65) Prior Publication Data

US 2007/0133878 A1 Jun. 14, 2007

(51) Int. Cl.
*G06K 9/46* (2006.01)
*G06K 9/00* (2006.01)
(52) U.S. Cl. .......... 382/195; 382/103; 382/191
(58) Field of Classification Search ........ 382/190, 382/103, 191, 195
See application file for complete search history.

(56) References Cited

U.S. PATENT DOCUMENTS

| | | | |
|---|---|---|---|
| 5,048,095 A * | 9/1991 | Bhanu et al. ............ | 382/173 |
| 2003/0101144 A1 * | 5/2003 | Moreno .................. | 705/62 |
| 2003/0107653 A1 * | 6/2003 | Utsumi et al. .......... | 348/207.99 |
| 2004/0101183 A1 * | 5/2004 | Mullick et al. .......... | 382/131 |
| 2006/0013454 A1 * | 1/2006 | Flewelling et al. ...... | 382/128 |
| 2006/0140455 A1 * | 6/2006 | Costache et al. ........ | 382/118 |
| 2007/0076955 A1 * | 4/2007 | Schaum et al. .......... | 382/191 |

OTHER PUBLICATIONS

A Metric for Covariance Matrices* Wolfgang FSrstner, Boudewijn Moonen Institut fiir Photogrammetrie, Universitat Bonn.*
Brunelli, R., Poggio, T.: Face recognition: Features versus templates. IEEE Trans. Pattern Anal. Machine Intell. 15 (1993) 1042-1052.
Mar'ee, R., Geurts, P., Piater, J., Wehenkel, L.: Random subwindows for robust image classification. In: Proc. IEEE Conf. on Computer Vision and Pattern Recognition, San Diego, CA. vol. 1. (2005) 34-40.
Turk, M., Pentland, A.: Face recognition using eigenfaces. In: Proc. IEEE Conf. on Computer Vision and Pattern Recognition, Maui, HI. (1991) 586-591.
Black, M., Jepson, A.: Eigentracking: Robust matching and tracking of articulated objects using a view-based representation. Intl. J. of Comp. Vision 26 (1998) 63-84.
Comaniciu, D., Ramesh, V., Meer, P.: Real-time tracking of non-rigid objects using mean shift. In: Proc. IEEE Conf. on Computer Vision and Pattern Recognition, Hilton Head, SC. vol. 1. (2000) 142-149.

(Continued)

*Primary Examiner*—Brian P Werner
*Assistant Examiner*—Michael Vanchy, Jr.
(74) *Attorney, Agent, or Firm*—Dirk Brinkman; Gene Vinokur

(57) ABSTRACT

A method constructs descriptors for a set of data samples and determines a distance score between pairs of subsets selected from the set of data samples. A d-dimensional feature vector is extracted for each sample in each subset of samples. The feature vector includes indices to the corresponding sample and properties of the sample. The feature vectors of each subset of samples are combined into a d×d dimensional covariance matrix. The covariance matrix is a descriptor of the corresponding subset of samples. Then, a distance score is determined between the two subsets of samples using the descriptors to measure a similarity between the descriptors.

30 Claims, 14 Drawing Sheets

OTHER PUBLICATIONS

Porikli, F.: Integral histogram: A fast way to extract histograms in cartesian spaces. In: Proc. IEEE Conf. on Computer Vision and Pattern Recognition, San Diego, CA. vol. 1. (2005) 829-836.

Leung, T., Malik, J.: Representing and recognizing the visual appearance of materials using three-dimensional textons. Intl. J. of Comp. Vision 43 (2001) 29-44.

Varma, M., Zisserman, A.: Statistical approaches to material classification. In: Proc. European Conf. on Computer Vision, Copehagen, Denmark. (2002).

Georgesu, B., Meer, P.: Point matching under large image deformations and illumination changes. IEEE Trans. Pattern Anal. Machine Intell. 26 (2004) 674-688.

Viola, P., Jones, M.: Rapid object detection using a boosted cascade of simple features. In: Proc. IEEE Conf. on Computer Vision and Pattern Recognition, Kauai, HI. vol. 1. (2001) 511-518.

Lowe, D.: Distinctive image features from scale-invariant keypoints. Intl. J. of Comp. Vision 60 (2004) 91-110.

Förstner, W., Moonen, B.: A metric for covariance matrices. Technical report, Dept. of Geodesy and Geoinformatics, Stuttgart University (1999).

Schmid, C.: Constructing models for content-based image retreival. In: Proc. IEEE Conf. on Computer Vision and Pattern Recognition, Kauai, HI. (2001) 39-45.

Georgescu, B., Shimshoni, I., Meer, P.: Mean shift based clustering in high dimensions: A texture classification example. In: Proc. 9th Intl. Conf. on Computer Vision, Nice, France. (2003) 456-463.

* cited by examiner

METHOD FOR CONSTRUCTING COVARIANCE MATRICES FROM DATA FEATURES

FIELD OF THE INVENTION

This invention relates generally to constructing descriptors of data samples, and more particularly to performing detection, recognition, and classification of the data samples using the descriptors.

BACKGROUND OF THE INVENTION

An important first step in detecting, recognizing, and classifying objects and textures in images is the selection of appropriate features. Good features should be discriminative, error resilient, easy to determine, and efficient to process.

Pixel intensities, colors, and gradients are example features that can be used in computer vision applications. However, those features are unreliable in the presence of illumination changes and non-rigid motion. A natural extension of pixel features are histograms, where an image region is represented with a non-parametric estimation of joint distributions of pixel features. Histograms have been widely used for non-rigid object tracking. Histograms can also be used for representing textures, and classifying objects and textures. However, the determination of joint distributions for several features is time consuming.

Haar features in an integral image have been used with a cascaded AdaBoost classifier for face detection, Viola, P., Jones, M., "Rapid object detection using a boosted cascade of simple features," Proc. IEEE Conf. on Computer Vision and Pattern Recognition, Vol. 1., pp. 511-518, 2001, incorporated herein by reference.

Another method detects scale space extremas for localizing keypoints, and uses arrays of orientation histograms for keypoint descriptors, Lowe, D., "Distinctive image features from scale-invariant keypoints," Intl. J. of Comp. Vision, Vol. 60, pp. 91-110, 2004. Those descriptors are very effective in matching local neighborhoods in an image, but do not have global context information.

SUMMARY OF THE INVENTION

One embodiment of the invention provides a method for constructing a descriptor for a set of data samples, for example, a selected subset or region of pixels in an image. Features of the region are extracted, and a covariance matrix is constructed from the features. The covariance matrix is a descriptor of the region that can be used for object detection and texture classification. Extensions to other applications are also described.

If the data set is a 2D image, the region descriptor is in the form of a covariance matrix of d-features, e.g., a three-dimensional color vector and norms of first and second derivatives of pixel intensities. The covariance matrix characterizes a region of interest in an image.

The covariance matrix can be determined from an integral image. Because covariance matrices do not lie in Euclidean space, the method uses a distance metric involving generalized eigenvalues, which follow from Lie group structures of positive definite matrices.

Feature matching is performed using a nearest neighbor search according to the distance metric. The performance of the covariance based descriptors is superior to prior art feature based methods. Furthermore, the descriptors are invariant to non-rigid motion and changes in illumination.

DETAILED DESCRIPTION OF THE PREFERRED EMBODIMENT

Figure 1:
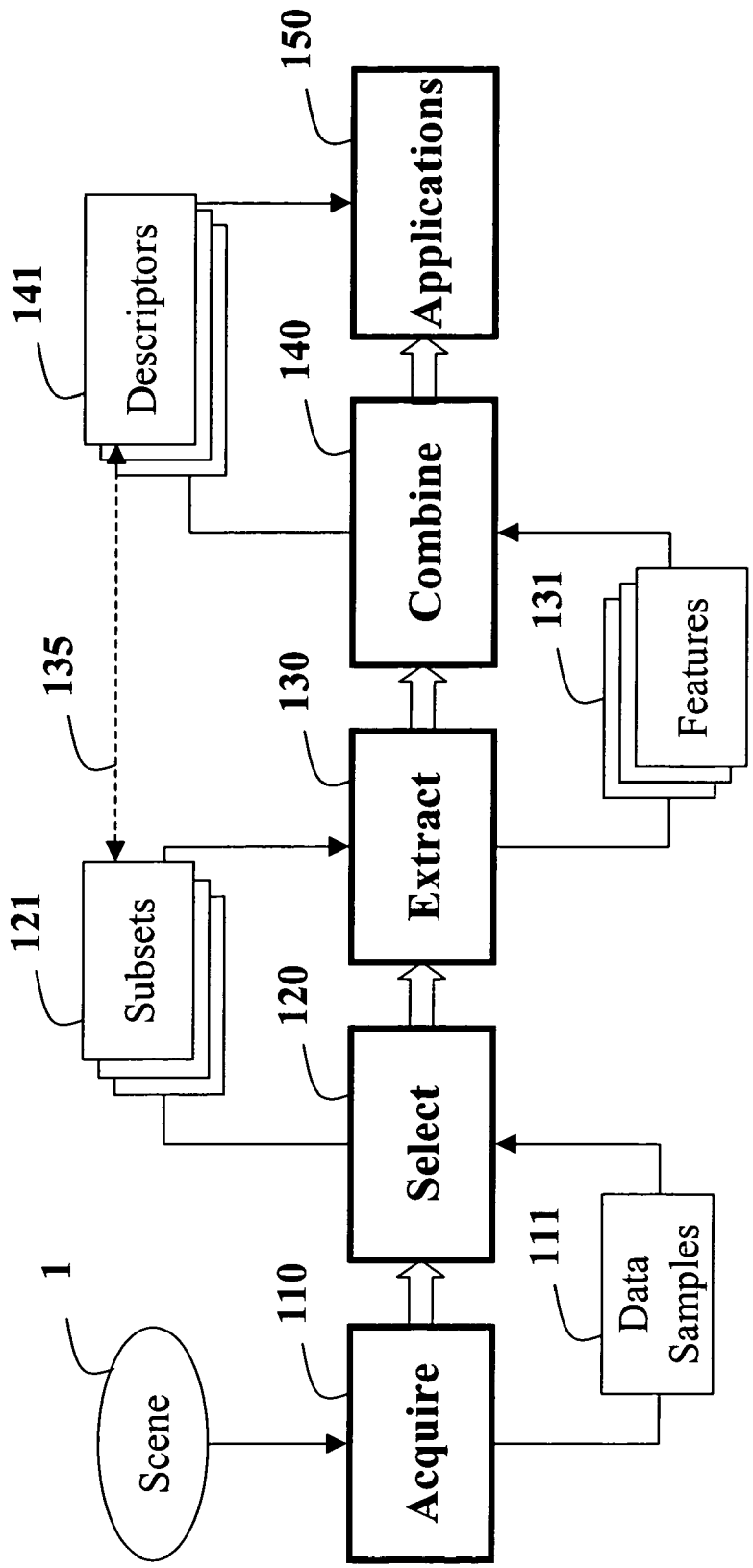
FIG. 1 is a flow diagram of a method for constructing a descriptor of a data set according to an embodiment of the invention.

FIG. 1 shows a method for constructing descriptors for sets data samples according to an embodiment of the invention. The descriptors can be used by a number of practical applications, particularly computer applications for detecting, recognizing, and classifying the sets of data samples.

Sample Acquisition

The method operates on a set of data samples 111 acquired 110 of a scene 1. The term 'scene' is defined broadly herein. For example, the scene can be a natural scene, including a person, a face, or some other object. The scene can also be a virtual scene generated by some known modeling process. Any known means for acquiring 110 the data samples 111 can be used, for example, cameras, antennas, 3D imaging devices, ultrasound sensors, and the like. The samples can also be generated synthetically. The actual sample acquisition step is optional. It should be understood that the samples can be obtained in some preprocessing step, and stored in a memory for processing as described herein.

The data samples 111 can have any number of dimensions. For example, if the data samples are in the form of images, then the samples include two-dimensional pixel data, e.g., pixel locations (x, y) and pixels intensities for each location. If the images are in color, then there are intensities for each RGB color channel. The data samples can also be volumetric data, e.g., a medical scan. In this case, the data includes coordinates (x, y, z) that have three dimensions. If the data samples are in the form of a video, then each pixel has two dimensions in space and one in time, (x, y, t). The time corresponds to the frame number. In any case, be it locations or spatio-temporal coordinates, the set of data samples include indices to the samples.

It should be understood that the samples can be associated with any number of other physical features or properties, such as amplitude, phase, frequency, polarity, velocity, weight, density, transparency, reflectance, hardness, temperature, and the like.

Sample Selection

One or more subsets 121 of samples are selected 120 from the set of data samples 111. For example, if the samples are pixels in an image and the application is face recognition, only samples in regions containing faces are selected for further processing. For the purpose of this description, the subset can encompass all acquired samples, e.g., an entire image.

Feature Extraction

Features 131 are extracted 130 for each sample. The features can be stacked in d-dimensional vectors. It should be understood that the features include the indices to the samples as well as higher order statistics of low level physical features, e.g., gradients, derivative, norms, and the like.

Covariance Construction

All of the feature vectors 131 for a given subset of samples 121 are combined 140 to construct a covariance matrix. The descriptors 141 correspond 135 to the subsets 121. The descriptors can be used for applications 150, such as object detection and texture classification.

Covariances as a Descriptor

The details of the embodiments of the invention are described using a pixel image as an example set of data samples 111.

Let I be a data set of samples 111 in the form of an image. The image can be acquired using visible light, infrared radiation, or other electromagnetic radiations. Let F be a W×H×d dimensional feature image extracted from a region (subset) of the image I:

$$F(x,y)=\phi(I,x,y), \quad (1)$$

where the function $\phi$ can be any feature mapping such as indices, intensity, color, gradients, derivatives, filter responses, feature statistics, and the like.

In a rectangular region $R \subset F$, a subset $\{Z_k\}_{k=1,\ldots,n}$ includes d-dimensional sample features vectors 131 of the region R. We represent the subset of samples 121 of the region R with a d×d covariance matrix $C_R$ 141 of the sample features, $$C_R = (1/n-1)\sum_{k=1}^{n}(z_k - \mu)(z_k - \mu)^T, \quad (2)$$

where n is the number of samples, z represents the features, $\mu$ is the mean of the feature samples, and T is a transpose operator.

There are several advantages of using covariance matrices as descriptors 141 for image regions 121. A single covariance matrix extracted from a region 121 is usually sufficient to match the region in different views and for different poses. In fact, we assume that the covariance of a particular distribution of samples is sufficient to discriminate the particular distribution from other distributions.

The covariance matrix 141 provides a natural way for combining multiple features 131 that might otherwise be correlated. The diagonal entries of the covariance matrix 141 represent the variance of each feature and the non-diagonal entries represent the correlations of the features. Noise associated with individual samples can be filtered with an average filter as the covariance matrix is constructed 140.

The covariance matrix is relatively low dimensional compared to prior art region descriptors such as histograms. Due to symmetry, the matrix $C_R$ has only $(d^2+d)/2$ different values, whereas if we represent the same region with raw feature values, then we need n×d dimensions. If joint feature histograms are used, then we need $b^d$ dimensions, where b is the number of histogram bins used for each feature.

Given an image region R, its covariance matrix $C_R$ does not have any information regarding the ordering and the number of samples in the region. This implies a certain scale and rotation invariance over different regions in different images. Nevertheless, if information regarding the orientation of the samples is represented, such as the norm of gradients with respect to x and y, then the covariance descriptor is no longer rotationally invariant. The same holds true for scale and illumination. Rotation and illumination dependent statistics are important for recognition and classification in computer vision applications.

Distance Score Calculation on Covariance Matrices

The covariance matrices 141, as described herein, do not lie in an Euclidean space. For example, the space is not closed under multiplication with negative scalars. Most common machine learning methods work only in Euclidean spaces. Therefore, those methods are not suitable for our features expressed in terms of covariance matrices.

Therefore, one embodiment of the invention constructs an intrinsic mean matrix $IM_{M \times M}$ because the covariance matrices do not conform to Euclidean geometry. Taking the average of such matrices would be inaccurate. It is possible to determine the mean of several covariance matrices using Riemannian geometry because positive definite covariance matrices have the Lie group structure.

A Lie group is an analytic manifold that is also a group, such that the group operations of multiplication and inversion are differentiable maps. Lie groups can be locally viewed as topologically equivalent to the vector space. Thus, the local neighborhood of any group element can be adequately described by its tangent space. The tangent space at the identity element of the group forms a Lie algebra. A Lie algebra is a vector space that is closed under the Lie bracket.

In several applications the Lie algebra is used for determining intrinsic means on Lie groups. Because Lie algebra is a vector space, we can determine a first order approximation to the true or intrinsic mean on this space.

Starting at an initial matrix $C_1$, and determining first order approximations to the intrinsic mean iteratively, we converge to a fixed point on the group. The iterative process is repeat for $t = 1$ to $T$ compute $c_t = \log(\hat{C}^{-1} C_t)$ compute $\Delta \hat{C} = \exp\left(\frac{1}{T}\sum_{t=1}^{T} c_t\right)$ assign $\hat{C} = \hat{C} \Delta \hat{C}$ until $\|\log(\Delta \hat{C})\| < \epsilon$ An error at each iteration of the process can be expressed in terms of higher order terms by a Baker-Campbell-Hausdorff formula, and mapping ensures that the error is minimized. At the end of the iterations, we have the intrinsic mean $IM = \hat{C}$, see P. Fletcher, C. Lu, and S. Joshi, "Statistics of shape via principal geodesic analysis on lie groups," Proc. IEEE Conf. on Computer Vision and Pattern Recognition, Vol. 1, pp. 95-101, 2003; V. Govindu, "Lie-algebraic averaging for globally consistent motion estimation," Proc. IEEE Conf. on Computer Vision and Pattern Recognition, Vol. 1, pp. 684-691, 2003; and O. Tuzel, R. Subbarao, and P. Meer, "Simultaneous multiple 3d motion estimation via mode finding on lie groups," Proc. 10th Intl. Conf. on Computer Vision, Vol. 1, pp. 18-25, 2005.

Figure 2:
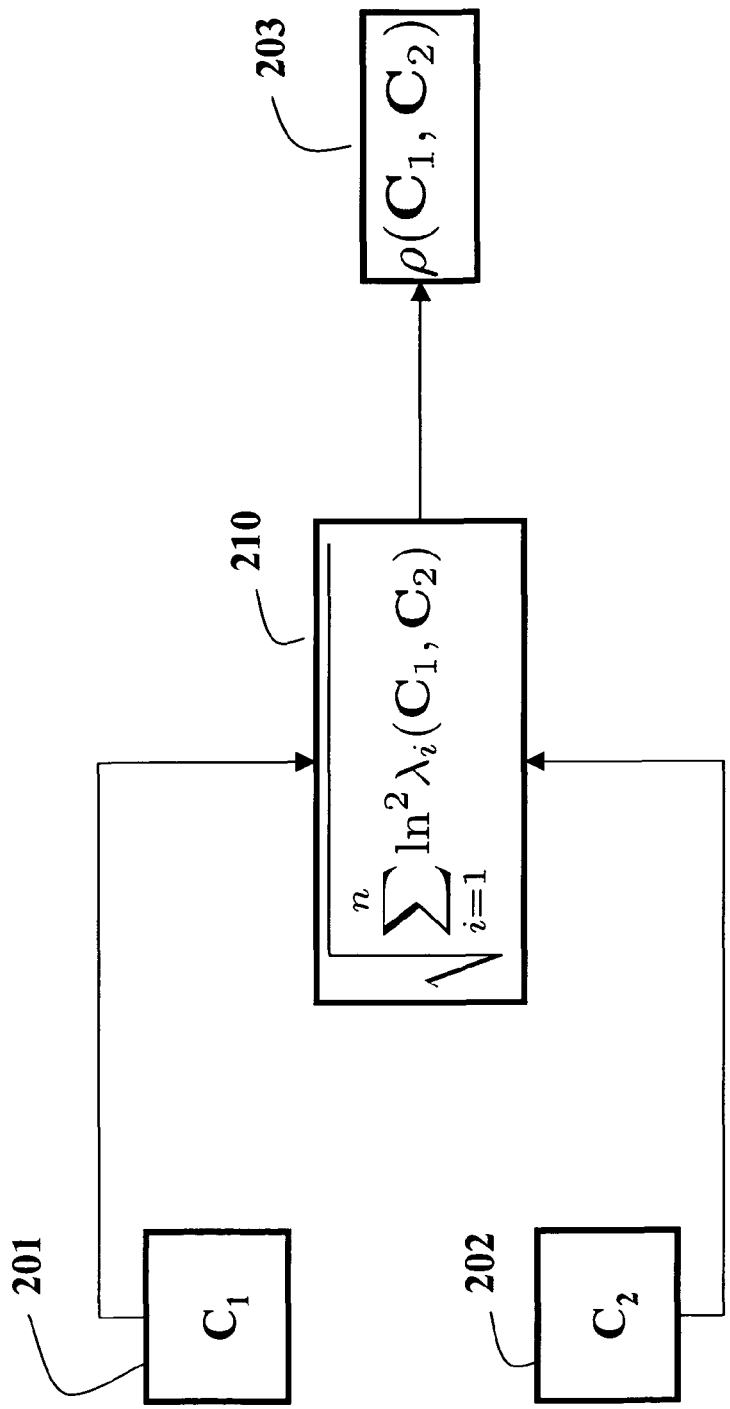
FIG. 2 is a flow diagram for determining distance scores according to an embodiment of the invention.
Figure 5:
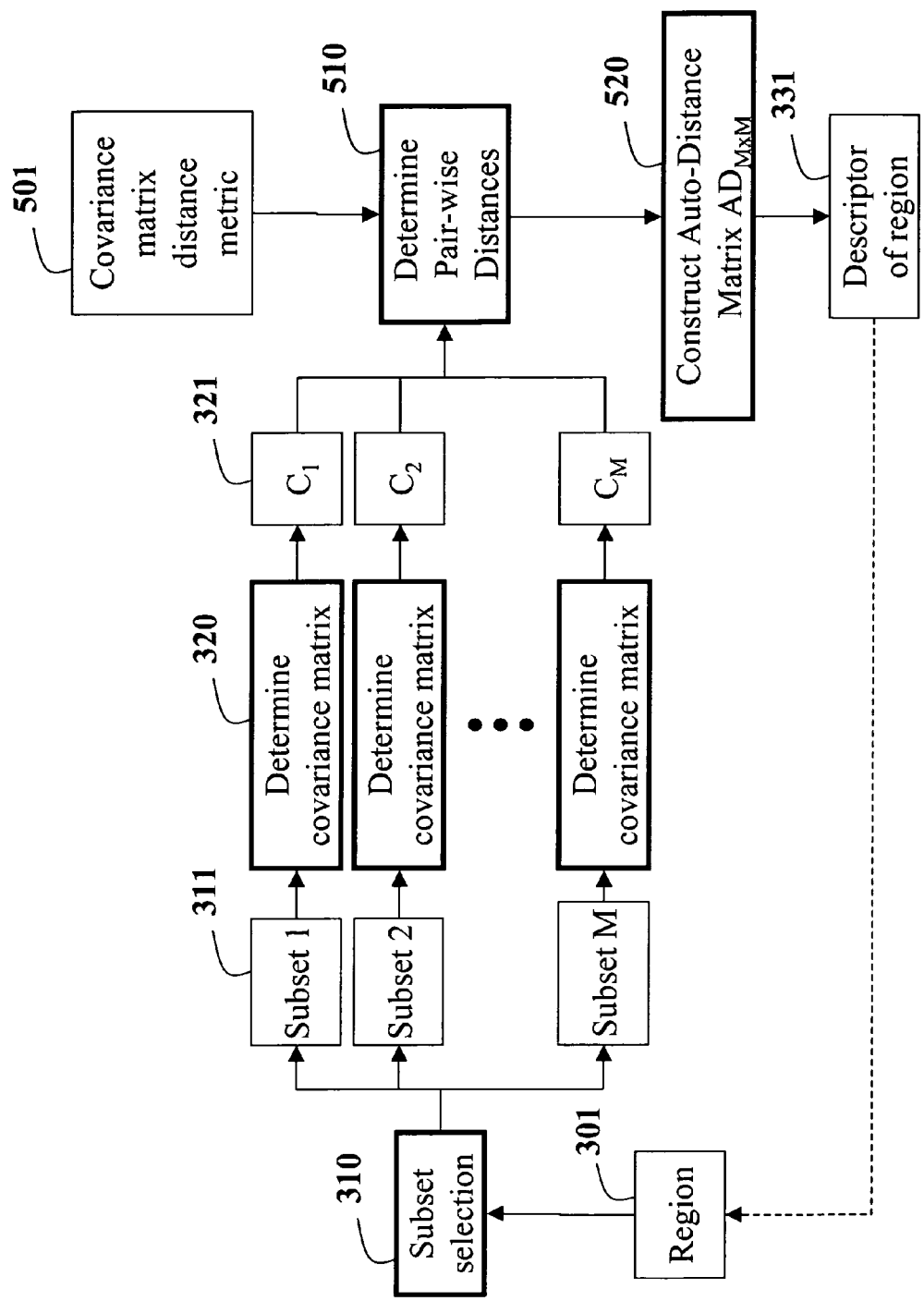

As shown in FIGS. 2 and 5, we use a nearest neighbor process to determine distance scores between covariance matrices 201-202. We adapt a distance metric 501 described by Förstner, W., Moonen, B., "A metric for covariance matrices," Technical report, Dept. of Geodesy and Geoinformatics, Stuttgart University, 1999, incorporated herein by reference.

An expression 210 is a 'dissimilarity' of a pair of covariance matrices ($C_1$, $C_2$), $$\rho(C_1, C_2) = \sqrt{\sum_{i=1}^{n} \ln^2 \lambda_i(C_1, C_2)}, \quad (3)$$

where $\{\lambda_i(C_1, C_2)\}_{i=1,\ldots,n}$ are generalized eigenvalues of $C_1$ and $C_2$, determined from $$\lambda_i C_1 x_i - C_2 x_i = 0 \quad i=1 \ldots d \quad (4)$$

and $x_i \neq 0$ are generalized eigenvectors. The distance score $\rho$ 203 satisfies the following axioms of the metric 501 for positive definite symmetric matrices $C_1$, $C_2$, and $C_3$.
1. $\rho(C_1, C_2) \geq 0$ and $\rho(C_1, C_2) = 0$ only if $C_1 = C_2$,
2. $\rho(C_1, C_2) = \rho(C_2, C_1)$,
3. $\rho(C_1, C_2) + \rho(C_1, C_3) \geq \rho(C_2, C_3)$.

The distance score also follows from the structure of the Lie group of positive definite matrices. A Lie group is a differentiable manifold obeying the group properties and satisfying the additional condition that the group operations are differentiable, see Förstner for details. An equivalent form can be derived from the Lie algebra of positive definite matrices.

Integral Images for Fast Covariance Computation

Figure 12:
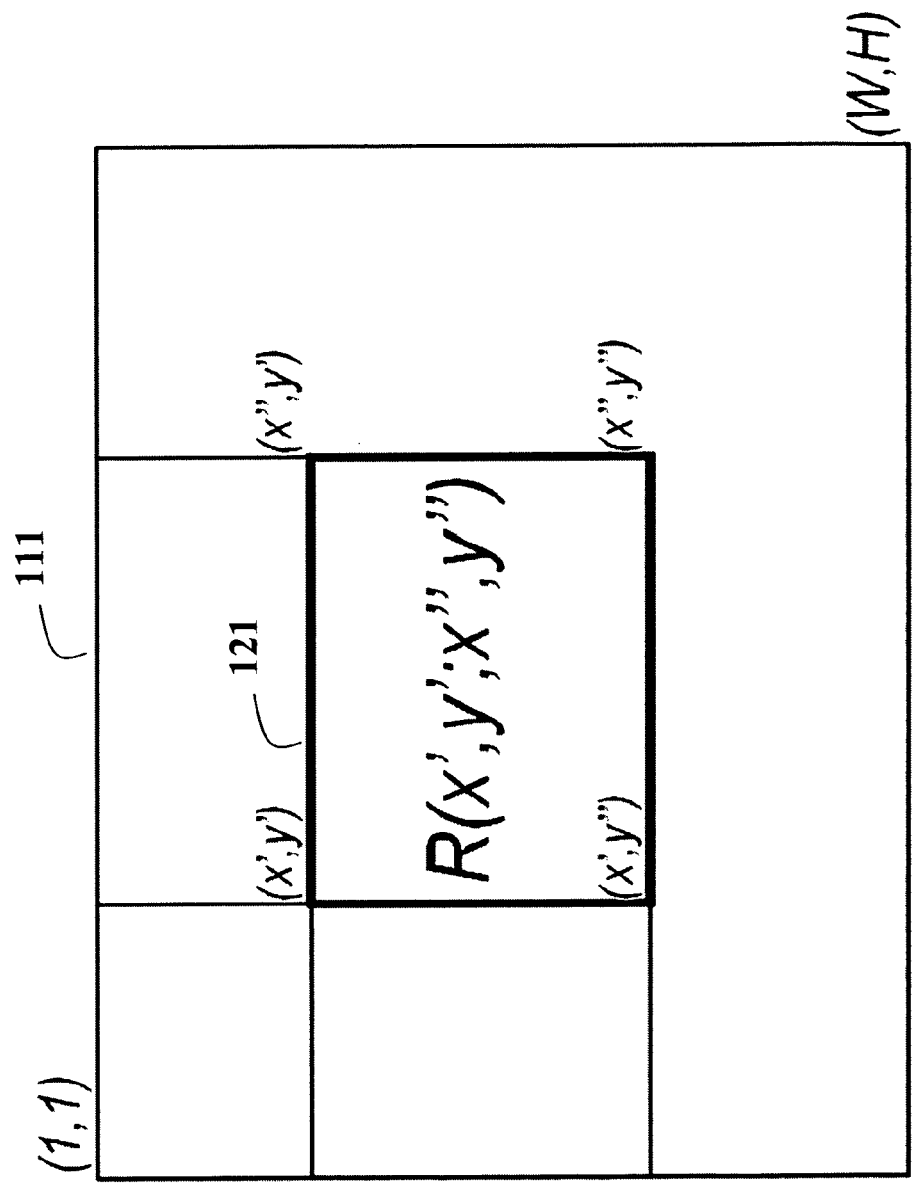
FIG. 12 is a block diagram of an integral image according to an embodiment of the invention.

As shown in FIG. 12, an integral image is an intermediate image representation used for summing regions, see Viola et al. A rectangular region R(x', y', x", y") 121, e.g. a subset, is defined by its upper left and lower right corners in an image 111 defined by (1,1) and (W, H). Each sample in the region is associated with a d dimensional feature vector 131.

Each pixel of the integral image R is the sum of all of the pixels inside the rectangle bounded by the upper left corner of the image and the pixel of interest. For an intensity image I, its integral image is defined as $$\text{Integral Image}(x', y') = \sum_{x<x', y<y'} I(x, y). \quad (5)$$

Using this representation, any rectangular region sum can be determined in a constant amount of time. The integral image can be extended to higher dimensions, see Porikli, F., "Integral histogram: A fast way to extract histograms in Cartesian spaces," Proc. IEEE Conf. on Computer Vision and Pattern Recognition, Vol. 1., pp. 829-836, 2005, incorporated herein by reference.

We use a similar technique for determining of region covariances. We can write the $(i,j)^{th}$ element of the covariance matrix defined in Equation (2) as $$C_R(i, j) = \frac{1}{n-1} \sum_{k=1}^{n} (z_k(i) - \mu(i))(z_k(j) - \mu(j)). \quad (6)$$

Expanding the mean and rearranging the terms, we can write $$C_R(i, j) = \frac{1}{n-1} \left[ \sum_{k=1}^{n} z_k(i) z_k(j) - \frac{1}{n} \sum_{k=1}^{n} z_k(i) \sum_{k=1}^{n} z_k(j) \right]. \quad (7)$$

To find the covariance in a given rectangular region R, we determine the sum of each feature dimension, $z(i)_{i=1,\ldots,n}$, as well as the sum of the multiplication of any two feature dimensions, $z(i)z(j)_{i,j=1,\ldots,n}$. We construct $d+d^2$ integral images for each feature dimension $z(i)$ and multiplication of any two feature dimensions $z(i)z(j)$.

Let P be the W×H×d tensor of a first order of the integral images $$P(x', y', i) = \sum_{x<x', y<y'} F(x, y, i) \quad (8)$$

$$i = 1 \ldots d$$

and Q be the W×H×d×d tensor of a second order integral images $$Q(x', y', i, j) = \sum_{x<x', y<y'} F(x, y, i) F(x, y, j) \quad (9)$$

$$i, j = 1 \ldots d.$$

Viola et al. describe how the integral image can be determined in one pass over the image. In our notation, $p_{x,y}$ is the d dimensional vector and $Q_{x,y}$ is the d×d dimensional matrix $$P_{x,y} = [P(x, y, 1) \ldots P(x, y, d)]^T \quad (10)$$

$$Q_{x,y} = \begin{pmatrix} Q(x, y, 1, 1) & \ldots & Q(x, y, 1, d) \\ & \vdots & \\ Q(x, y, d, 1) & \ldots & Q(x, y, d, d) \end{pmatrix}.$$

Note that $Q_{x,y}$ is a symmetric matrix and $d+(d^2+d)/2$ passes are sufficient to determine both p and Q.

Let R(x', y'; x", y") be the rectangular region, where (x', y') is the upper left coordinate and (x", y") is the lower right coordinate, as shown in FIG. 12. The covariance of the region bounded by (1, 1) and (x', y') is $$C_{R(1,1;x',y')} = \frac{1}{n-1} \left[ Q_{x',y'} - \frac{1}{n} p_{x',y'} p_{x',y'}^T \right] \quad (11)$$

where n=x'·y'. Similarly, the covariance of the region R(x', y'; x", y") is $$C_{R(x',y',x'',y'')} = \frac{1}{n-1} \begin{bmatrix} Q_{x'',y''} + Q_{x',y'} - Q_{x'',y'} - Q_{x',y''} - \\ \frac{1}{n}(p_{x'',y''} + p_{x',y'} - p_{x'',y'} - p_{x',y''}) \\ (p_{x'',y''} + p_{x',y'} - p_{x'',y'} - p_{x',y''})^T \end{bmatrix} \quad (12)$$

where n=(x"−x')·(y"−y').

Object Location

For object location, it is desired to determine a location of the object in an image for an arbitrary pose of the object after a non-rigid transformation.

Figure 3:
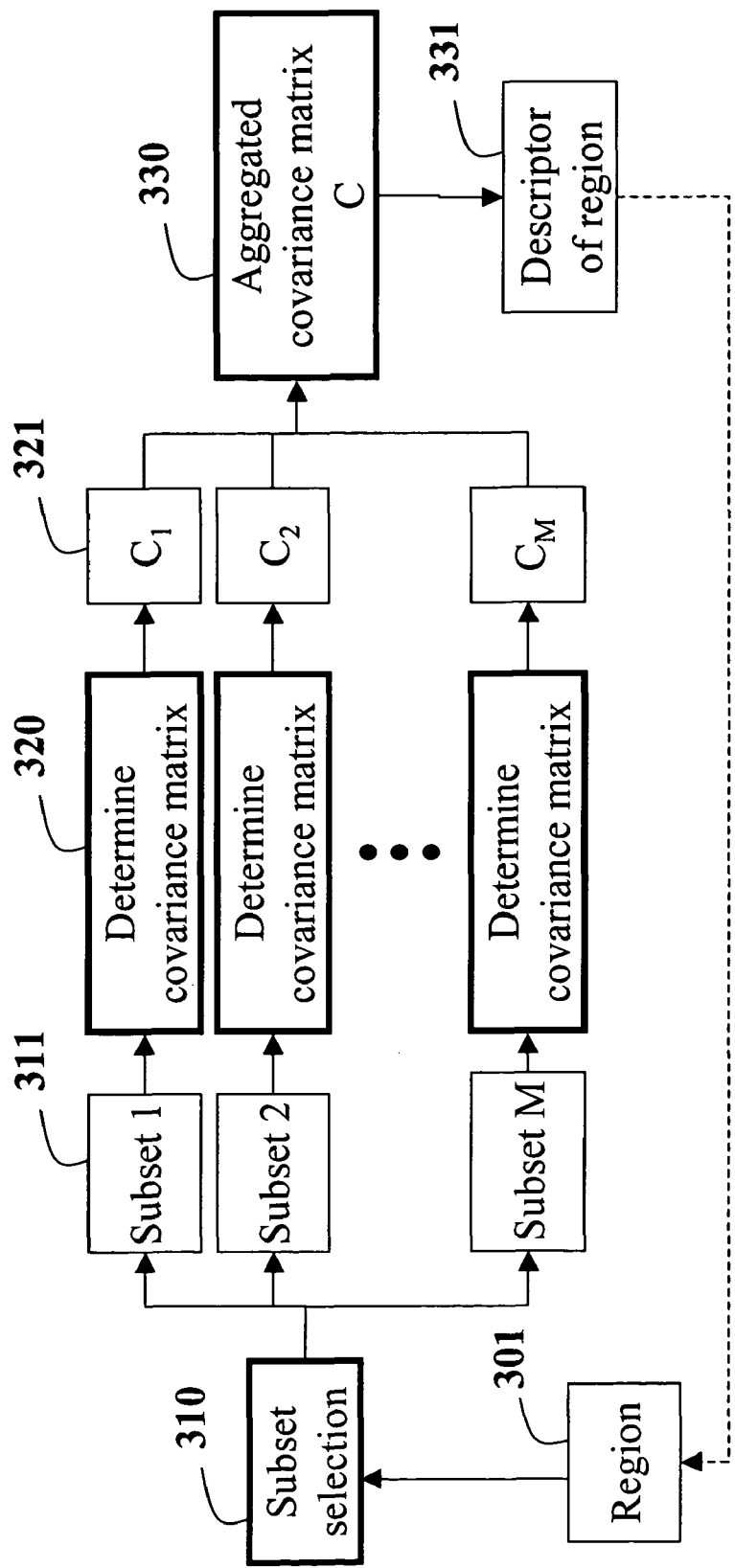
FIGS. 3-6 are flow diagrams of a method for aggregating distance scores as a descriptor according to embodiments of the invention.

FIG. 3 shows the general steps for object location. Regions 301 are identified, and subsets 311 of samples (pixels) are selected 310. Covariance matrices 321 are determined 320, and the matrices 321 are arranged 330 into a single aggregate matrix C which is a descriptor 331 of the region 301. The aggregate matrix C simply has all elements of all covariances matrices arranged in one matrix, e.g., by stacking the matrices.

Figure 4:
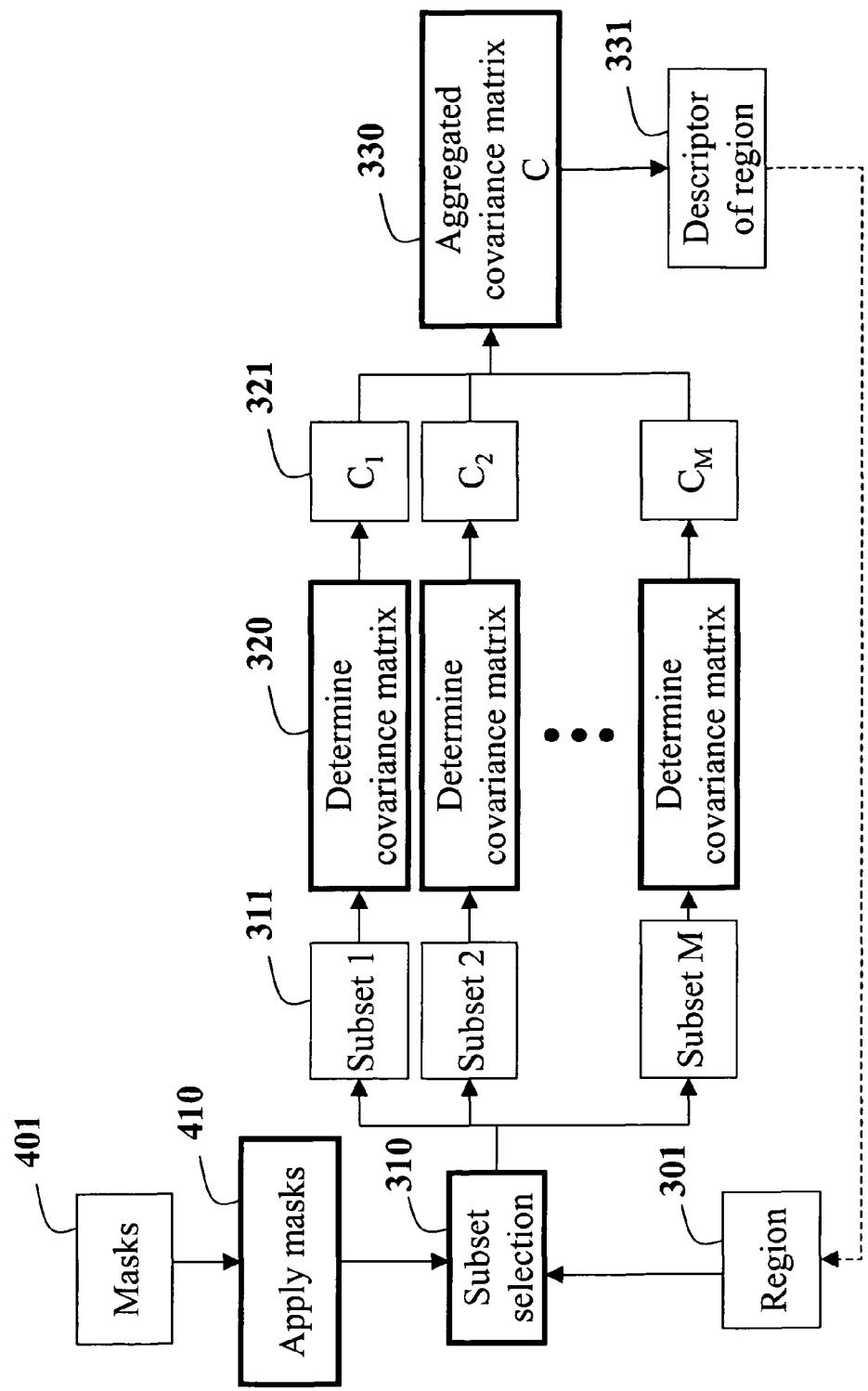

As shown in FIG. 4, masks 401 can be defined and applied 410 as part of the selection step 310.

Figure 6:
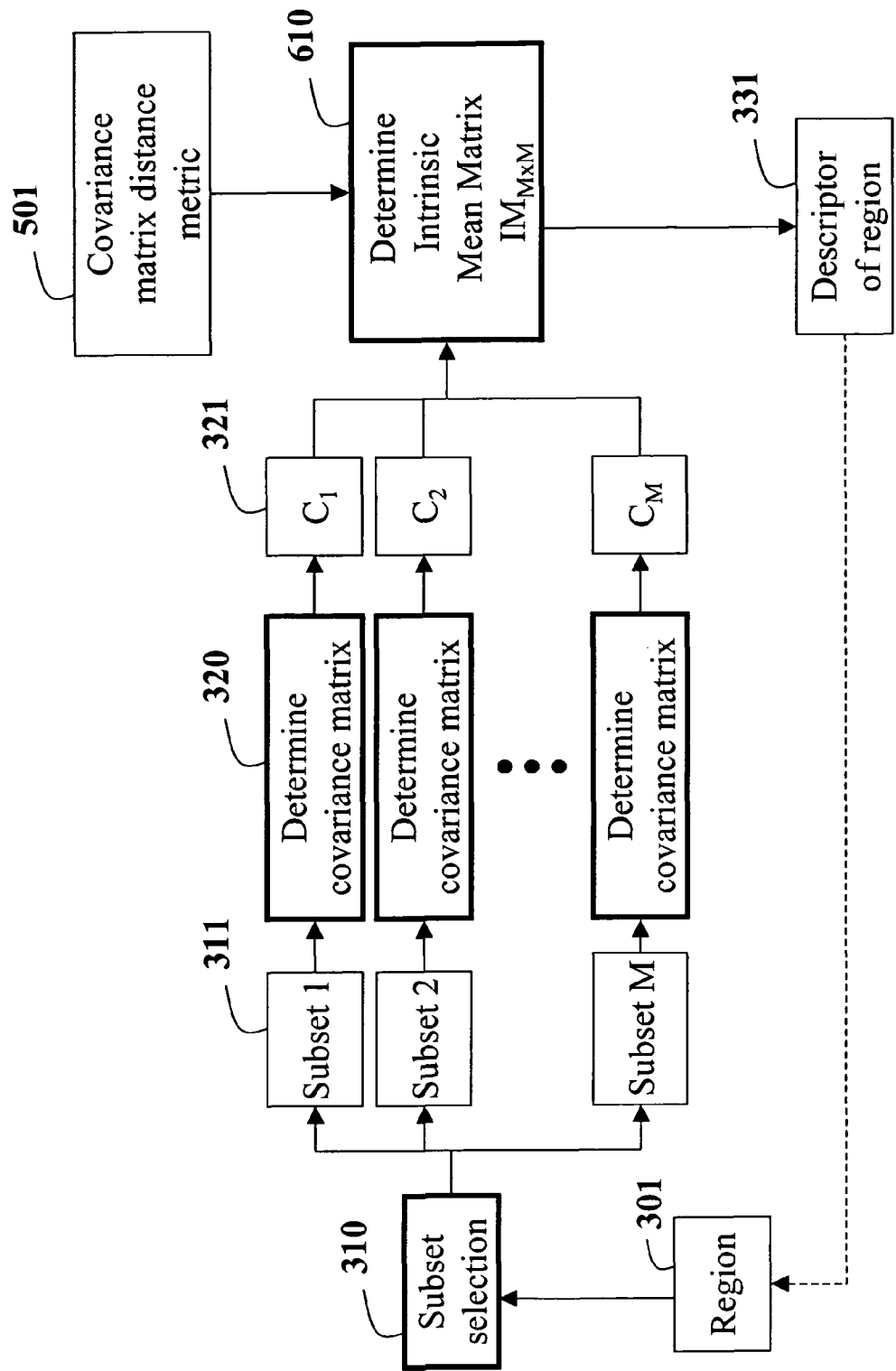

As shown in FIG. 5, the descriptor 331 can also be constructed as follows. A covariance distance metric 501 is defined as described above. Distance scores are determined 510 between all possible pairs of covariance matrices. The distance scores are used to construct 520 an auto-distance matrix $AD_{M \times M}$, e.g., $d_{11}, d_{12}, d_{13}, \ldots, d_{21}, d_{22}, d_{23}, \ldots$, which is the descriptor 331 of the object in the region. As shown in FIG. 6, an alternative determination 610 constructs an intrinsic mean matrix $IM_{M \times M}$ as the descriptor 331. The intrinsic mean is described in greater detail below.

Figure 7:
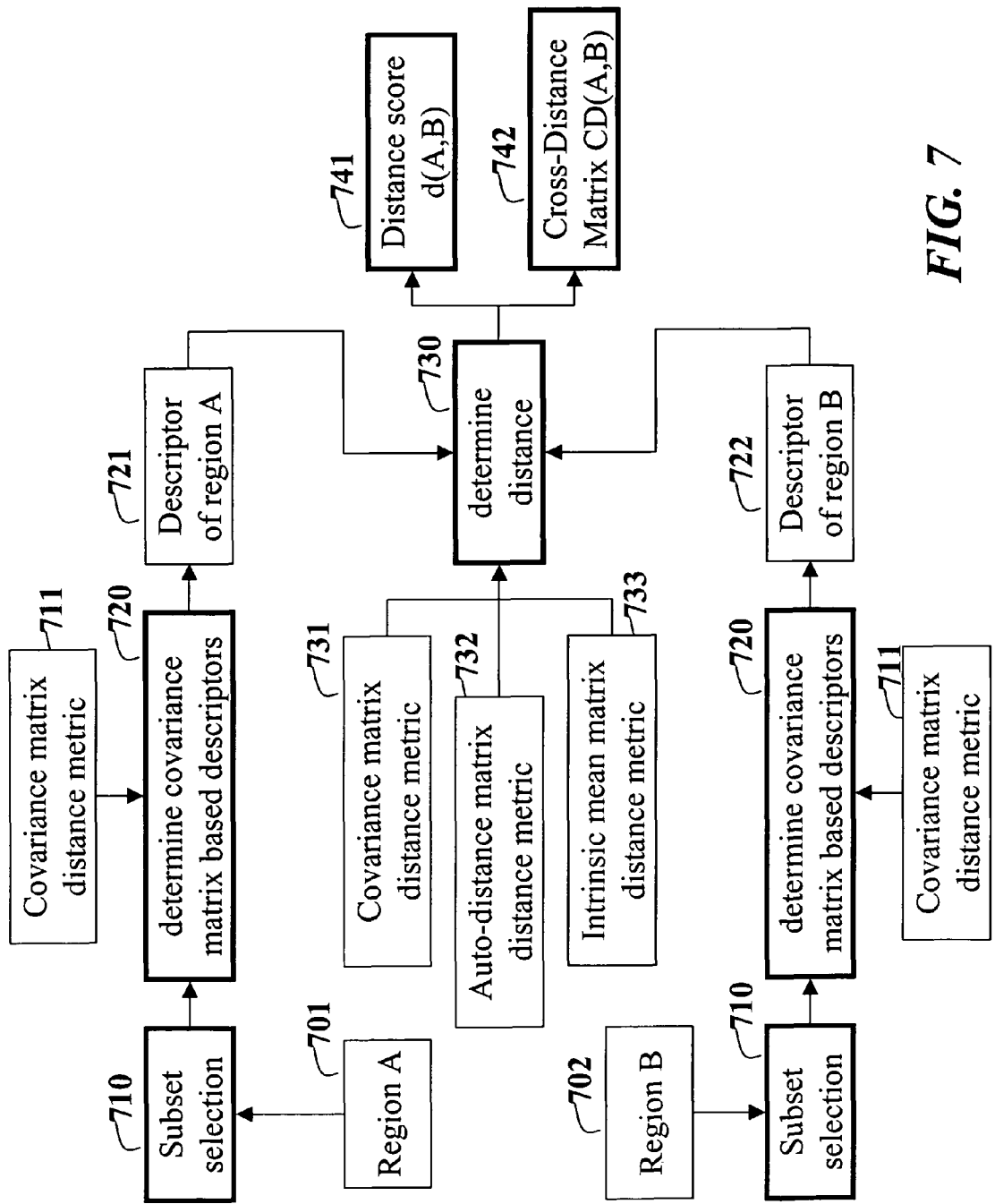
FIG. 7 is a flow diagram for determining a cross distance score for multiple regions in images according to an embodiment of the invention.

FIG. 7 shows how multiple regions in images can be compared according to an embodiment of the invention. Subsets are selected 710 from regions 701 and 702 of one or more images. Covariance matrix descriptors 721 and 722 are constructed 720 according to a distance metric 711. Distance scores 741 and 742 are determined 730 using the metrics 731-733. The distance scores 741 are the pair-wise distances, and the cross-distances 742 measures distances between all possible pair of covariance matrices.

Figure 8:
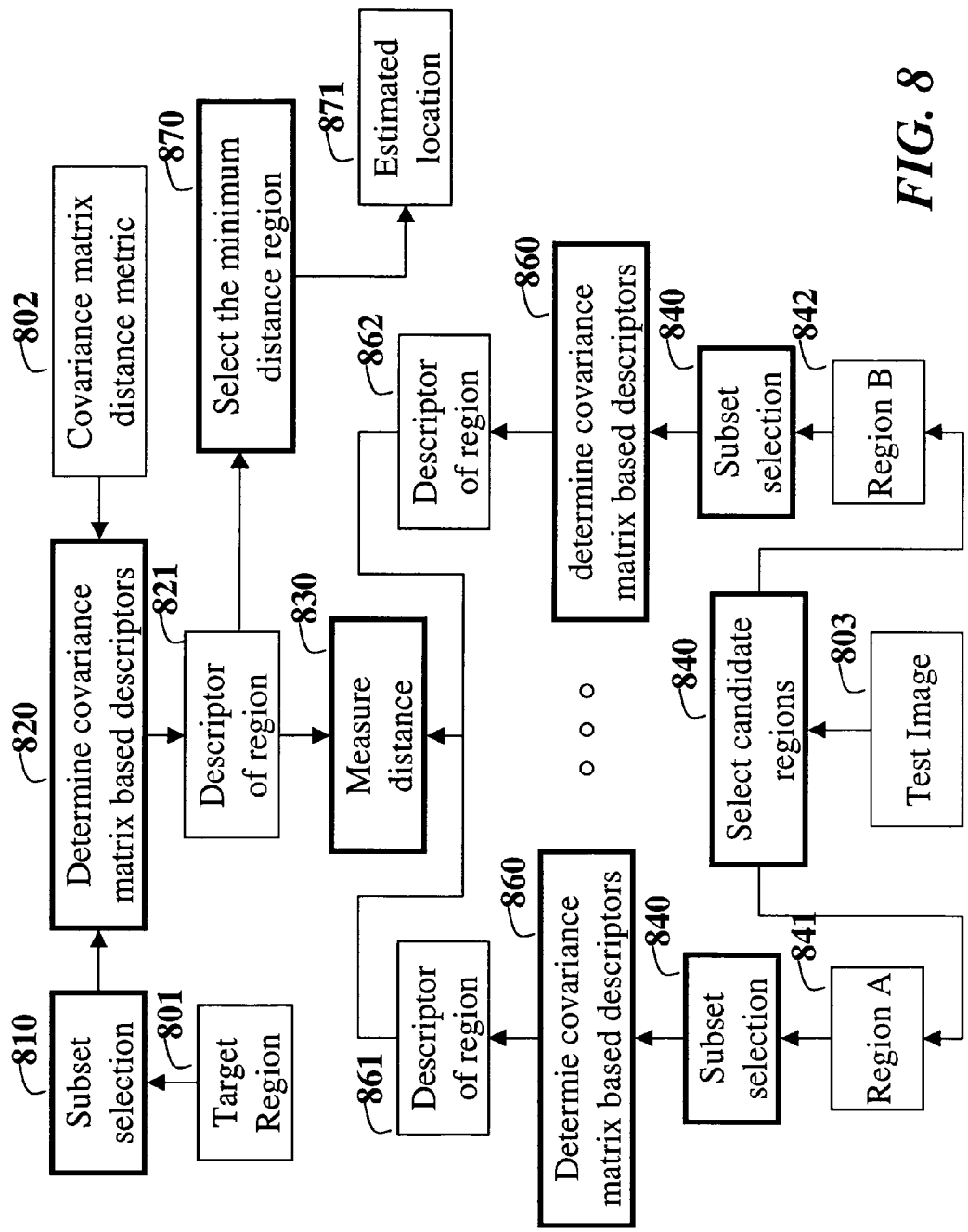
FIGS. 8 and 9 are flow diagrams for estimating a location of an object in an image according to embodiments of the invention.

FIG. 8 shows details of a method for locating an object in an unknown image. The basic input image is a target region 801 of some target image, which includes a known object of interest, and a test image 803. The goal is to estimate, in the test image, the location of a similar object, e.g., a face as shown in the target region.

Subsets are selected 810 from the target region 801, and a descriptor 821 is determined 820 according to the metric 802. One or more candidate regions 841-842 are selected 840 in the test image 803. Descriptors 861-862 are determined 860 from covariance matrices of subsets 840 of the regions, as described above.

Distances between the descriptor 821 of the known object in the target image 801, and the descriptors 861-862 are determined 830. A minimum one of those distances is selected 870 as the estimated location 871 of the object in the test image 803.

Figure 9:
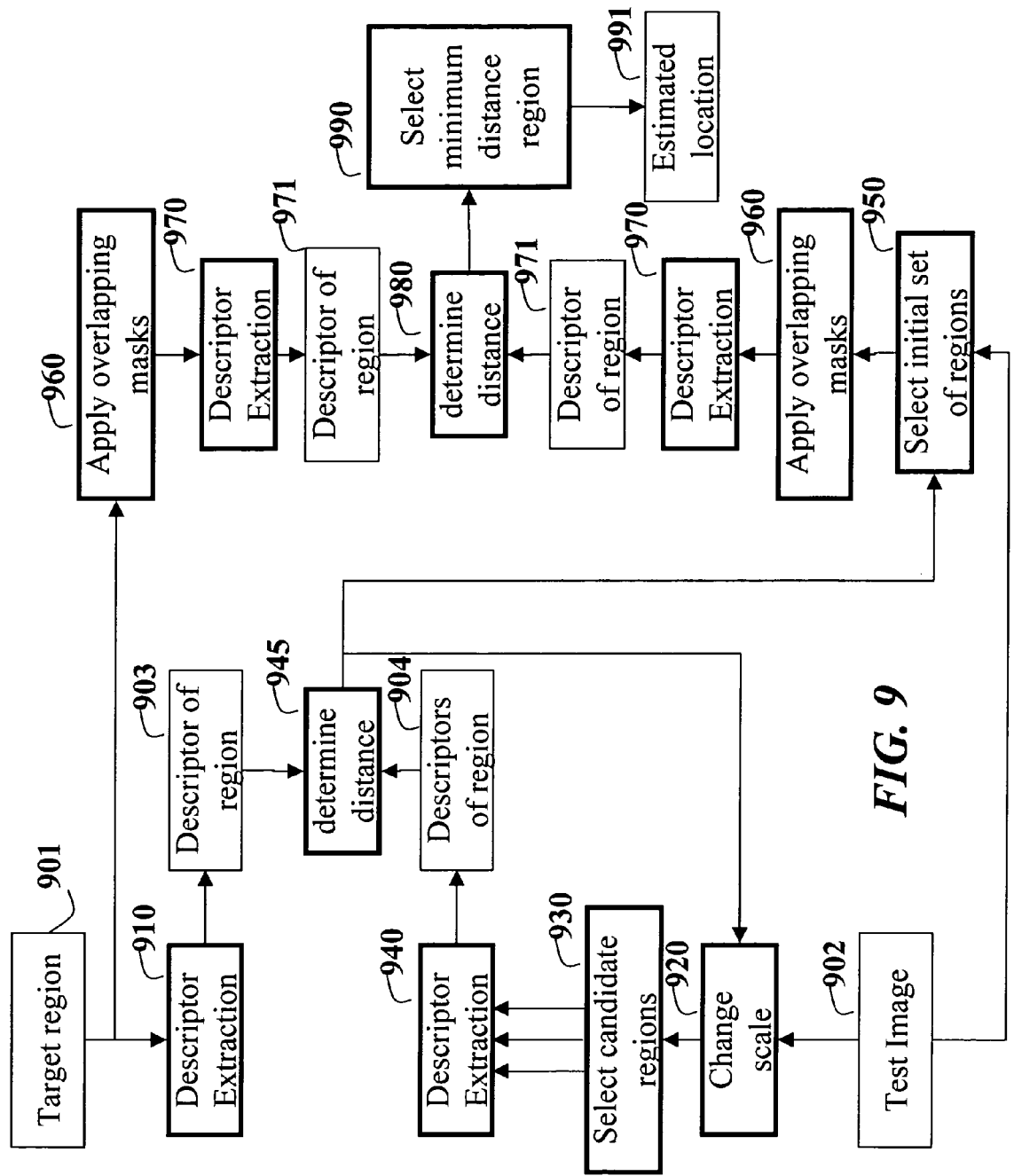

FIG. 9 shows an alternative embodiment for object location. As before, there is a target region 901 that includes a known object. It is desired to locate a similar object in some region of a test image 902. A descriptor 903 is extracted 910 from the target region 901. A scale (pixel resolution) of the test image 902 can be changed 920 and candidate regions can be selected 930 for descriptor extraction 940. A distance between the descriptors 903 and 904 can be determined 945. The distance can be used to change 920 the scale for selecting a new candidate region.

The distance can also be used, following selection 950 of an initial set of regions, to apply 960 overlapping masks, see below, and extract 970 descriptors 971 of masked regions. Distances are determined 980, and a minimum distance is selected 990 for the estimated location 991 of the object in the test image 902.

Figure 10:
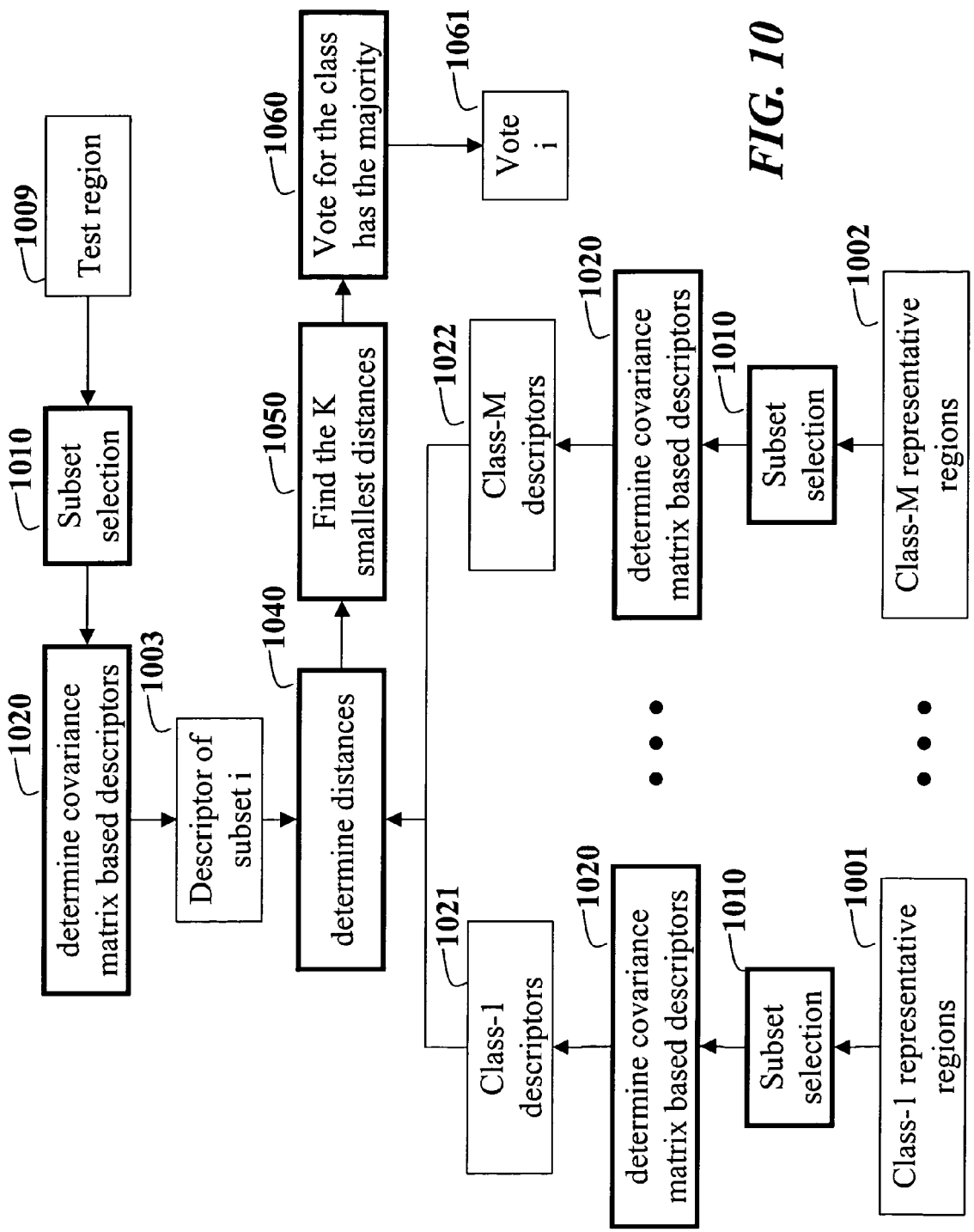
FIGS. 10 and 11 are flow diagrams for classifying textures according to embodiments of the invention.
Figure 11:
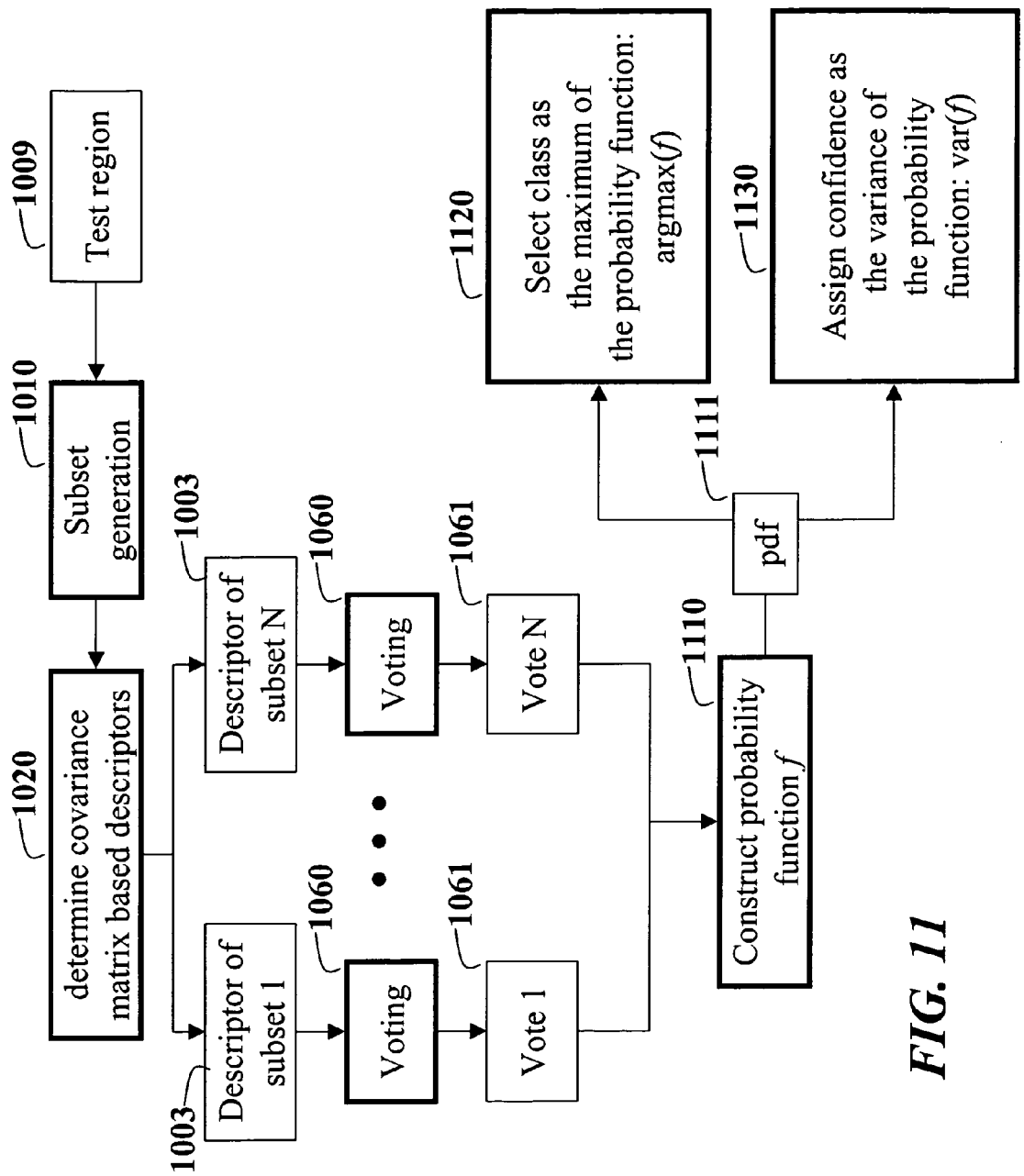

FIGS. 10 and 11 show the steps of a method for classifying a texture in an image using the basic covariance based techniques as described above. Image regions 1001-1002 represent various classes of 'known' textures. Subsets are selected 1010, and covariances matrices are determined 1020 to extract descriptors 1021-1022 of the various classes of textures. All of the above steps can be performed once during preprocessing to train and setup up a texture classification database.

A test region 1009 is supplied. It is desired to classify the 'unknown' texture in the test region. Subsets are selected 1010 from the test region, and descriptors 1003 are obtained 1020 via the covariance matrices. Step 1040 determines distances between test region and the already classified regions. The K smallest distances are determined 1050, and votes 1061 are made using majority voting 1060 to determine the probability of the texture in the test region being similar to the texture in one of the classified regions.

As shown in FIG. 11, the votes 1061 can be used to construct 1110 a probability distribution function (pdf) 1111. Then, the pdf can be used to select 1120 a class that corresponds to a maximum of the pdf, and the variance of the pdf can be used to assign 1130 a confidence in the selection.

Details of the above steps are now described.

Features

We use pixel locations (x, y) or indices of the samples, color (RGB) values, and the norm of the first and second order derivatives of the intensities with respect to x and y as sample features. Each pixel of the image is converted to a nine-dimensional feature vector F 131

$$F(x, y) = \begin{bmatrix} x & y & R(x,y) & G(x,y) & B(x,y) \\ \left|\frac{\partial I(x,y)}{\partial x}\right| & \left|\frac{\partial I(x,y)}{\partial y}\right| & \left|\frac{\partial^2 I(x,y)}{\partial x^2}\right| & \left|\frac{\partial^2 I(x,y)}{\partial y^2}\right| \end{bmatrix}^T \quad (13)$$

where x and y are indices; R, G, and B are the RGB color values; and I is the intensity. The image derivatives can be determined using filters $[-1\ 0\ 1]^T$ and $[-1\ 2\ -1]^T$. Therefore, the region is characterized by a 9×9 covariance matrix 141. Although the variance of pixel locations (x, y) is identical for all the regions of the same size, the variances are still important because correlation of the variances with variances of other features are used as non-diagonal entries of the covariance matrix 141.

Figure 13:
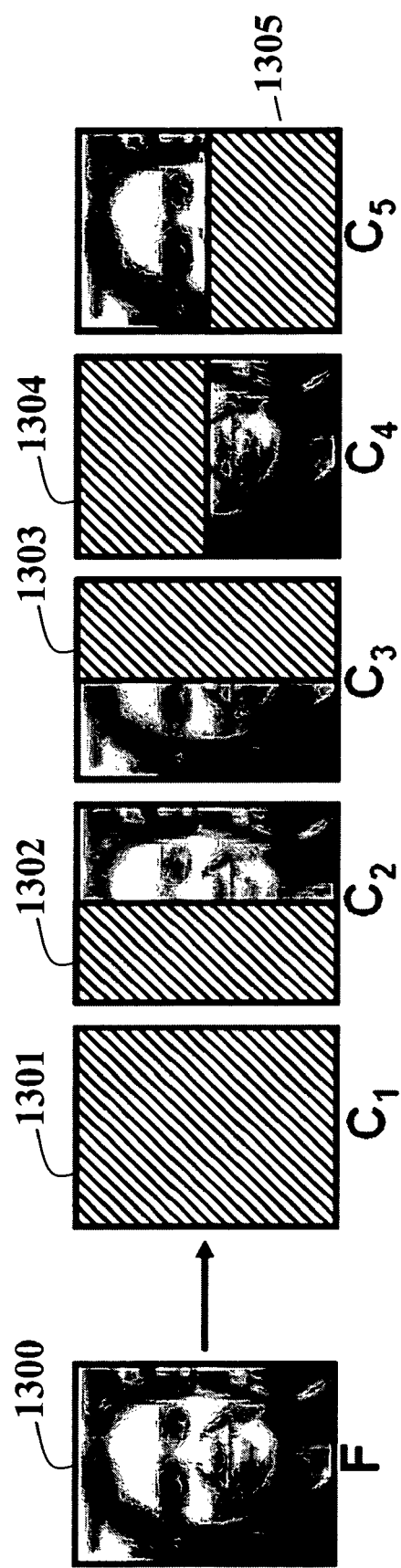
FIG. 13 is an image of an object and image regions according to an embodiment of the invention.

As shown in FIG. 13, we represent an object in an image 1300 with five covariance matrices, $C_1, \ldots, C_5$, of the image features determined for five selected region 1301-1305 (subsets of pixel samples). Initially we determine the covariance of the entire region 1301 from the input image.

We search a target image for a region having a similar covariance matrix, and the dissimilarity is measured using Equation (3). At all of the locations in the target image, we analyze at nine different scales, i.e., four smaller and four larger, to find matching regions, step 920 FIG. 9. We perform a complete search, because we can determine the covariance of an arbitrary region very quickly using the integral image.

Instead of scaling 920 the target image, we change the size of our search window. There is a 15% scaling factor between two consecutive scales. The variance of the x and y components are not the same for regions with different sizes. Therefore, we normalize the corresponding rows and columns in the covariance matrices. At a smallest size of the window, we move three pixels horizontally or vertically between two search locations. For larger windows we jump 15% more and round to the next integer at each scale.

We keep the one thousand best matching locations and scales. In a second phase, we repeat the search for the one thousand detected locations, using the covariance matrices $C_{i=1,\ldots,5}$. The dissimilarity of the object region and a target region is $$\rho(O, T) = \min_j \left[ \sum_{i=1}^{5} \rho(C_i^O, C_i^T) - \rho(C_j^O, C_j^T) \right] \quad (14)$$

where $C^O_i$ and $C^T_i$ are the object and target covariances respectively. We ignore the region with the largest covariance difference. This increases performance in the presence of possible occlusions and large illumination changes. The region with the smallest minimum dissimilarity is selected 990 as the matching region at the estimated location.

Texture Classification

In the prior art, the most successful methods for texture classification use textons. For background on textons see, Julesz, B., "Textons, the elements of texture perception and their interactions," Nature, Vol. 290, pp. 91-97, 1981. Textons are cluster centers in a feature space derived from an input image. The feature space is constructed from the output of a filter bank applied at every pixel in the input image. Different filter banks can be applied, as briefly reviewed below.

LM uses a combination of 48 anisotropic and isotropic filters, Leung, T., Malik, J., "Representing and recognizing the visual appearance of materials using three-dimensional textons," Intl. J. of Comp. Vision, Vol. 43, pp. 29-44, 2001. The feature space is 48 dimensional.

S uses a set of 13 circular symmetric filters, Schmid, C., "Constructing models for content-based image retrieval," Proc. IEEE Conf. on Computer Vision and Pattern Recognition, Kauai, Hi., pp. 39-45, 2001. The feature space is 13 dimensional.

M4 and M8 are described by Varma, M., Zisserman, A., "Statistical approaches to material classification," Proc. European Conf. on Computer Vision, 2002. The filters include both rotationally symmetric and oriented filters but only maximum response oriented filters are included to feature vector. The feature spaces are 4 and 8 dimensional, respectively.

Usually, k-means clustering is used to locate textons. The most significant textons are aggregated into a texton library, and texton histograms are used as texture representation. The $X^2$ distance is used to measure the similarity of two histograms. The training image with the smallest distance from the test image determines the class of the latter. This process is computationally time-consuming because the images are convolved with large filter banks and in most cases requires clustering in high dimensional space.

Covariances for Texture Classification

Figure 14:
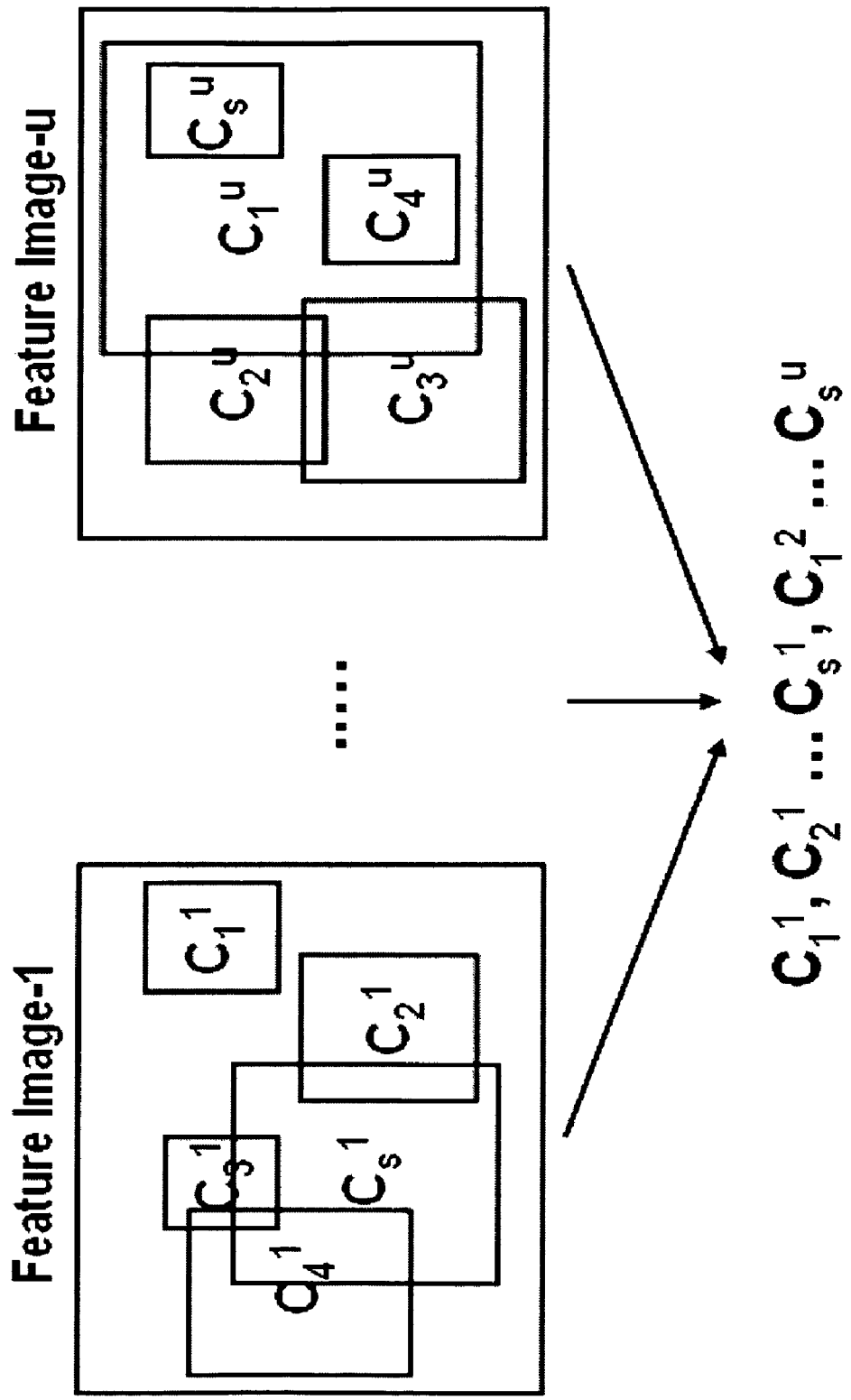
FIG. 14 is a block diagram of texture classification according to an embodiment of the invention.

FIG. 14 diagrammatically shows the texture classification method according to an embodiment of the invention as introduced above. The method does not use textons.

The classification has a preprocessing training phase with known textures in classified regions 1001-1002. The classification operates on test regions 1009 having an unknown texture.

During training, we begin by extracting 130 features for each sample or pixel. For texture classification, the features include pixel indices, pixel intensities, and norms of the first and second order derivatives of the intensities in both the x and y directions. Each pixel is mapped to a d=5 dimensional feature vector 131

$$F(x, y) = \left[ I(x, y) \left| \frac{\partial I(x, y)}{\partial x} \right| \left| \frac{\partial I(x, y)}{\partial y} \right| \left| \frac{\partial^2 I(x, y)}{\partial x^2} \right| \left| \frac{\partial^2 I(x, y)}{\partial y^2} \right| \right]^T. \quad (15)$$

We sample randomly selected 120 regions from each set of data samples or image 111. The regions range in sizes between 16×16 and 128×128 pixels. Using integral images as described above, we construct the covariance matrix 141 of each region 121. Each texture image is then represented with s covariance matrices. We also have u training texture images from each texture class, and a total of s×u covariance matrices. We repeat the process for c texture classes and construct a representation for each known texture class in the same way.

Given the test image 1009, we also construct covariance matrices for randomly selected regions as described above. For each covariance matrix, we measure the distance using Equation (3), from all the matrices of the training set, and the label is predicted according to the majority voting 1060 among the k nearest matrices, using k-NN clustering, see generally: Fix, E. and Hodges, "Discriminatory analysis: Nonparametric discrimination: consistency properties," Report 4, Project number 21-49-004, USAF School of Aviation Medicine, Randolph Field, Tex., 1951.

Our classifier performs as a weak classifier and the class of the texture is determined according to the maximum votes among the s weak classifiers.

EFFECT OF THE INVENTION

Embodiments of the invention provide methods that use covariance matrices of features for object detection and texture classification. The methods can be extended in several ways. For example, first, an object is detected in a video, and subsequently the object is tracked.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for constructing descriptors for a set of data samples, comprising a computer for performing steps of the method, comprising the steps of:
   selecting multiple subsets of samples from a set of data samples;
   extracting a d-dimensional feature vector for each sample in each subset of samples, in which the feature vector includes indices to the corresponding sample and properties of the sample;
   combining the feature vectors of each subset of samples into a d×d dimensional covariance matrix, the covariance matrix being a descriptor of the corresponding subset of samples; and
   determining a distance score between a pair of covariance matrices to measure a similarity of the corresponding subsets of samples;
   defining a covariance distance metric;
   determining pair-wise distance scores between pairs of the covariance matrices;
   constructing a d×d dimensional auto-distance matrix from the pair-wise distance scores; and
   assigning the auto-distance matrix as the descriptor of the set of data samples.

2. The method of claim 1, further comprising:
   arranging the covariance matrices into an aggregated covariance matrix as the descriptor of the set of data samples.

3. The method of claim 1, further comprising:
defining a covariance distance metric;
determining iteratively a first order approximation of an intrinsic mean matrix of the covariance matrices; and
assigning the intrinsic mean matrix as the descriptor of the set of data samples.

4. The method of claim 1, further comprising:
applying masks to set of data samples.

5. The method of claim 1, in which the indices are spatial.

6. The method of claim 5, in which the set of data samples includes pixels of an image.

7. The method of claim 6 in which the feature vectors include locations of the pixels in the image.

8. The method of claim 7, in which the feature vectors including intensities of the pixels, color information of the pixels, color gradients of the pixels, color derivatives of the pixels, and filter responses of the pixels.

9. The method of claim 6, further comprising:
determining a set of integral images from the image; and
deriving the covariance matrices from the set of integral images.

10. The method of claim 9, further comprising:
determining a first order of the integral images as $$P(x', y', i) = \sum_{x<x', y<y'} F(x, y, i) \; i = 1 \ldots d,$$

and
a second order of the integral images as $$Q(x', y', i, j) = \sum_{x<x', y<y'} F(x, y, i) F(x, y, j) \; i, j = 1 \ldots d.,$$

where x and y represent the locations of the pixels.

11. The method of claim 9, further comprising:
constructing the covariance matrices of different sized regions from the corner point values of the first and second order integral images.

12. The method of claim 6, further comprising:
locating an object in a test image according to the covariance matrices.

13. The method of claim 12, further comprising:
constructing covariance matrices for pixels in an entire region of the test image including the object and pixels in sub-regions including the object; and
assigning the multiple covariance matrices as a descriptor of the object.

14. The method of claim 12, further comprising:
selecting multiple test regions from the test image;
constructing multiple covariance matrices as descriptors of test regions;
determining distance scores for the test regions; and
assigning a minimum distance score as an estimated location of the object in the test image.

15. The method of claim 14, further comprising:
assigning an initial size to a target region to obtain a candidate region including the object;
selecting multiple test regions from the image with the initial size;
determining distance scores between the descriptors; and
changing a size; and
iterating the selecting and determining steps.

16. The method of claim 6, further comprising:
classifying textures in the image according to the covariance matrices.

17. The method of claim 16, further comprising:
representing each class of known textures in known regions as a first set of covariance matrices;
representing each test region with an unknown texture as a second set of covariance matrices;
determining distances scores between the first and second covariance matrices;
selecting a class that has a minimum distance score as the class of the test region.

18. The method of claim 17, further comprising:
giving a single vote to a particular class that has a minimum distance score to each covariance matrix of the test region; and
selecting the class that has a majority vote as the class of the test region.

19. The method of claim 18, further comprising:
computing a variance of the class votes; and
assigning the variance as a confidence score.

20. The method of claim 5, in which the set of data samples includes points of a volumetric data set.

21. The method of claim 20, in which the feature vectors include coordinates of the pixels.

22. The method of claim 1, in which the indices are temporal.

23. The method of claim 22, in which the set of data samples includes pixels of a video.

24. The method of claim 1, in which the indices are spatial and temporal.

25. The method of claim 1, in which the covariance matrix is $$CR = \frac{1}{n-1} \sum_{k=1}^{n} (z_k - \mu)(z_k - \mu)^T,$$

where n is the number of samples in the subset, z represents the feature vectors, $\mu$ is a mean of the features, and T is a transpose operator.

26. The method of claim 1, in which diagonal entries of the covariance matrix represent variances of the features and non-diagonal entries represent correlations of the features.

27. The method of claim 1, further comprising:
filtering the set of data samples prior to extracting the feature vectors.

28. The method of claim 1, in which the distance score is $$\rho(C_1, C_2) = \sqrt{\sum_{i=1}^{n} \ln^2 \lambda_i(C_1, C_2)},$$

where $\{\lambda_i(C_1, C_2)\}_{i=1,\ldots,n}$ are generalized eigenvalues of two covariance matrices $C_1$ and $C_2$, according to $\lambda_i C_1 x_i - C_2 x_i = 0$, for $i=1, \ldots, d$, and $x \neq 0$ are generalized eigenvectors of the covariance matrices.

29. The method of claim 1, further comprising:
constructing a cross-distance matrix from multiple pairwise distances.

30. The method of claim 1, further comprising:
determining the distance scores as $$\rho(O, T) = \min_j \left[ \sum_{i=1}^{5} \rho(C_i^O, C_i^T) - \rho(C_j^O, C_j^T) \right],$$

where $C_i^O$ and $C_i^T$ represent various covariance matrices.

* * * * *